3,523,102
POLYOXYMETHYLENES HAVING LATERAL
AMINO GROUPS AND PROCESS FOR PRE-
PARING THEM
Karl-Heinz Häfner, Bad Orb, and Harald Cherdron, Wiesbaden, Germany, assignors to Farbwerke Hoechst Aktiengesellschaft vormals Meister Lucius & Brüning, Frankfurt am Main, Germany, a corporation of Germany
No Drawing. Filed Nov. 24, 1967, Ser. No. 685,271
Claims priority, application Germany, Dec. 14, 1966,
F 50,937
Int. Cl. C08g 1/04, 1/14, 1/16
U.S. Cl. 260—67          6 Claims

ABSTRACT OF THE DISCLOSURE

Polyoxymethylenes having free amino groups are prepared by copolymerizing trioxane or formaldehyde with polymerizable nitro compounds and, if desired, cyclic ethers or cyclic acetals, and then reducing the nitro groups of the copolymer.

---

The present invention provides polyoxymethylenes having lateral amino groups and a process for preparing them.

It is known that, under the action of cation-active catalysts, trioxane and cyclic ethers having at least two vicinal carbon atoms in the nucleus, form copolymers which are stable against alkaline degradation and which are valuable plastic materials because of their good mechanical and physical properties. Copolymers of this type, however, have the disadvantage that, apart from chemical stabilizing reactions at the end of the polymer chain, they cannot be subsequently modified in the chain itself by chemical reactions. Furthermore, it is known that trioxane can be copolymerized with bi-functional compounds, for example cyclohexene - 1,2-oxide-4,4-dioxymethyleneformal and $\beta,\gamma$ - epoxypropoxy-$\beta',\gamma'$-carbonato-propoxy-alkanes. This process provides polymers which are already crosslinked either under the polymerization conditions or during the subsequent tempering.

We have now found that polyoxymethylenes having free amino groups can be prepared by copolymerizing from 60 to 99.99% by weight of trioxane or formaldehyde with 0.01 to 30% by weight of polymerizable nitro compounds and from 0 to 20% by weight of cyclic ethers or cyclic acetals and then reducing the nitro groups to primary amino groups.

As comonomers there are used nitro compounds of the Formula I (I) 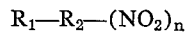

in which $R_1$ may represent a 2,3-epoxy-propyloxy radical or a 1,3-dioxolano-4-methyloxy radical and $R_2$ may represent an aromatic hydrocarbon radical having 6 or 10 ring carbon atoms and being substituted by $(A)_x$ and/or $(B)_y$, A being an alkyl radical having from 1 to 6 carbon atoms, and B being an alkoxy radical having from 1 to 6 carbon atoms, $x$ being zero or an integer of from 1 to 4, $y$ being zero or an integer of from 1 to 4, the sum of $x$ and $y$ being less than 5 and $n$ being an integer of from 1 to 3.

Appropriate nitro compounds are, for example, ortho-, meta-, para-glycidoxy-nitrobenzene, 1-glycidoxy-2,4-dinitrobenzene, 1-glycidoxy-2,4,6-trinitrobenzene, p-[1,3-dioxolano - 4 - methoxy] - nitrobenzene, 1 - glycidoxy - 4 - nitronaphthalene, 1 - glycidoxy - 2,4 - dinitronaphthalene, 1 - glycidoxy - 2 - methyl-4-nitrobenzene or 1-glycidoxy-2-methoxy-4-nitrobenzene.

Instead of trioxane, formaldehyde may also be used for the copolymerization. However, trioxane is preferred.

In addition to trioxane or formaldehyde and the ionically polymerizable nitro compounds, cyclic ethers or cyclic acetals may be used in amounts ranging from 0 to 20% by weight, calculated on the total monomer mixture. Suitable cyclic ethers and cyclic acetals are preferably those having from 3 to 8 ring atoms, the ring containing at least 2 vicinal carbon atoms, for example, ethylene oxide, propylene oxide, epichlorohydrin, 1,4-butane-diol formal, diethylene-glycol formal, 1,4-butene-diol formal, 1,4-butane-diol diglycidyl ether, oxacyclobutane and 1,3-dioxolane.

The process of the invention yields compolymers or terpolymers, in which the comonomer containing the nitro group is incorporated into the macromolecular chain. The monomeric nitro compounds do not have a chain-stopping action so that products having a high molecular weight can be obtained. The nitro compounds may be incorporated by polymerization in high proportions (exceeding 10% of the total batch) without producing an appreciable inhibiting effect on the polymerization reaction. Thus, after terpolymers of trioxane, ethylene oxide and p-glycidoxy-nitrobenzene have been subjected to an alkaline treatment in benzyl alcohol at a temperature of 150° C. and subsequently boiled several times with methanol, the infrared spectrum thereof shows the band which is typical of the nitro group.

The copolymers or terpolymers containing nitro groups are subsequently reduced by known methods. The reducing agents used are, for example, molecular hydrogen in the presence of hydrazine hydrate and Raney nickel, the nickel®, or hydrogen sulfide in the presence of ammonia, or hydrazine hydrate in the presence of alkali or sodium dithionite. The reaction procedure is especially smooth when hydrazine hydrate is used in the presence of traces of Raney nickel. The reduction temperature is in the range of from 0 to 200° C., preferably from 50 to 170° C., the catalyst proportion is in the range of from 0.01 to 10% by weight, calculated on the total batch.

The reduction may be carried out in suspension as well as in solution. Suitable suspending agents are, for example, alcohols or chlorinated hydrocarbons such as ethanol, ethylene chloride or chlorobenzene. Suitable solvents are, for example, benzyl alcohol, ethyl diglycol or o-dichlorobenzene.

For example, when a terpolymer containing nitro groups has been reduced in a solution of benzyl alcohol at a temperature in the range of from 120 to 125° C. in the presence of hydrazine hydrate and Raney nickel, the infrared spectrum thereof no longer shows the nitro band, but instead shows the corresponding primary amino band.

The cationic copolymerization of trioxane may be carried out in bulk (melt), in solution or in suspension by methods known in the art. As solvents or suspending agents for the monomers and the catalysts, there may be mentioned inert aliphatic or cycloaliphatic hydrocarbons having from 5 to 18 carbon atoms, for example n-hexane or cyclohexane. The polymerization is, however, preferably carried out in the melt at a temperature in the range of from +60 to +110° C. When the polymerization is carried out in solution or suspension, the polymerization temperatures may be in the range of from −50 to +110° C.

As initiators for the copolymerization with trioxane carried out according to the invention, there are especially suitable Lewis acids (defined by Kortüm, Lehrbuch der Elektrochemie, Wiesbaden, 1948, pp. 300 and 301), preferably boron trifluoride. Boron trifluoride is preferably used in the form of its complex compounds, for example an etherate, an oxonium fluoroborate or a substituted aryl-diazonium fluoroborate. The concentration of the catalyst used depends, above all, on its activity as an initiator and may be within the range of from 0.0001 to 1.0% by weight, calculated on the whole monomer mixture.

For eliminating the unstable semi-acetal terminal groups, the copolymers of the invention may be subjected to a known alkaline degradation (disclosed in Belgian Pat. No. 617,897). It is advantageous to add to the copolymers, light stabilizers and oxidation stabilizers.

The polyoxymethylenes having free amino groups, prepared according to the invention, may be processed thermoplastically into technically versatile shaped articles having an improved adhesion to metals or glass fibers. They are, however, also suitable, in various manners, for the subsequent chemical modification of polyoxymethylenes. Thus, for example, stabilizers may be chemically incorporated into the macromolecules. The products are excellent adhesives.

The following examples serve to illustrate the invention, but they are not intended to limit it thereto.

EXAMPLE 1

0.7 milliliter of $BF_3$-dibutyl-etherate, as a catalyst (diluted to a ratio of 1:40 with cyclohexane) was added to a batch consisting of 95 grams of trioxane and 5 grams of p-glycidoxy-nitrobenzene. The batch was polymerized in a thermally constant bath at a temperature of 70° C. in a closed vessel. The polymerization time was 60 minutes. The polymer block obtained was ground and treated for 30 minutes at a temperature of 150° C. in benzyl alcohol containing 1% by weight of triethanol amine, for eliminating the unstable semi-acetal terminal groups and the residual monomers. When cool, the polymer was filtered with suction, boiled several times with methanol and dried in vacuo at a temperature within the range of from 50 to 70° C. Subsequently, the polymer powder was dissolved in 2 liters of benzyl alcohol, to which 50 milliliters of an aqueous hydrazine hydrate solution of 80% strength were added, at a temperature in the range of from 120 to 130° C. and, after solution, a trace of Raney nickel was added thereto. The reaction mixture was maintained at a temperature in the range of from 120 to 130° C. for 30 minutes. When cool, the polymer was filtered with suction, boiled with methanol and dried in vacuo at a temperature in the range of from 50 to 70° C. The yield of the polymer containing amino groups was 77 grams.

The melt index $i_2$ was 15.7 grams per 10 minutes (ASTM D1238–52T).

EXAMPLE 2

In a manner analogous to that disclosed in Example 1, 88 grams of trioxane, 2 grams of ethylene oxide and 10 grams of p-glycidoxy-nitrobenzene were polymerized with 1 milliliter of $BF_3$-dibutyl-etherate (in a 1:40-dilution). After alkaline degradation and reduction, the yield was 57 grams.

The melt index $i_2$ was 16.1 grams per 10 minutes (ASTM D1238–52T).

EXAMPLE 3

In a manner analogous to that disclosed in Example 1, 95 grams of trioxane, 2 grams of ethylene oxide and 3 grams of 1-glycidoxy-2.4-dinitrobenzene were polymerized with 0.5 milliliter of $BF_3$-dibutyl-etherate (in a 1:40-dilution). After alkaline degradation and reduction, the yield was 63 grams.

The melt index $i_2$ was 9.4 grams per 10 minutes (ASTM D1238–52T).

EXAMPLE 4

In a manner analogous to that disclosed in Example 1, 96 grams of trioxane, 2 grams of ethylene oxide and 2 grams of 1-glycidoxy-4-nitronaphthalene were polymerized with 0.5 milliliter of $BF_3$-dibutyl-etherate (in a 1:40-dilution). After alkaline degradation and reduction, the yield was 74 grams.

The melt index was 4.3 grams per 10 minutes (ASTM D1238–52T).

What is claimed is:

1. A process for preparing polyoxymethylenes which comprises copolymerizing from 60 to 99.99% by weight of trioxane or formaldehyde, from 0 to 20% by weight of a cyclic ether or cyclic acetal having from 3 to 8 carbon and oxygen atoms in a ring structure containing at least two vicinal carbon atoms and from 0.01 to 30% by weight of a comonomer having the general formula $$R_1\!-\!R_2\!-\!(NO_2)_n$$

in which $R_1$ represents a 2,3-epoxy-propyloxy radical or a 1,3-dioxolano-4-methyloxy radical, $R_2$ represents an aromatic hydrocarbon radical having 6 or 10 ring carbon atoms, which is substituted by $(A)_x$ or $(B)_y$ or by $(A)_x$ and $(B)_y$, A being an alkyl radical having from 1 to 6 carbon atoms, B being an alkoxy radical having from 1 to 6 carbon atoms, $x$ and $y$ each being zero or an integer of from 1 to 4, and the sum of $x$ and $y$ being less than 5, and $n$ from 1 to 3, said copolymerization being carried out in the presence of from 0.001 to 1.0% by weight, based on the weight of the monomer mixture, of a cation-active catalyst at a temperature of −50° to +110° C. to form a polyoxymethylene polymer having lateral nitro groups, and reducing the lateral nitro groups of said polymer to primary amino groups in the presence of a reducing agent at a temperature of 0° to 200° C.

2. A process according to claim 1 and wherein said comonomer is p-glycidoxy-nitrobenzene.

3. A process according to claim 1 and wherein said cyclic ether is ethylene oxide and said comonomer is p-glycidoxy-nitrobenzene.

4. A method according to claim 1 and wherein said cyclic ether is ethylene oxide and said comonomer is 1-glycidoxy-2,4-dinitrobenzene.

5. A process according to claim 1 and wherein the cyclic ether is ethylene oxide and the comonomer is 1-glycidoxy-4-nitronaphthalene.

6. A polyoxymethylene having free amino groups prepared by the process of claim 1.

References Cited

UNITED STATES PATENTS

| | | | |
|---|---|---|---|
| 3,261,805 | 7/1966 | Griffiths et al. | 260—45.8 |
| 3,354,212 | 11/1967 | Donaruma | 260—566 |
| 3,385,827 | 5/1968 | Fischer et al. | 260—67 |
| 3,425,992 | 2/1969 | Yamauchi et al. | 260—67 |

WILLIAM H. SHORT, Primary Examiner

L. M. PHYNES, Assistant Examiner

U.S. Cl. X.R.

260—45.9, 45.95